United States Patent [19]

Chuang

[11] Patent Number: 5,121,767
[45] Date of Patent: Jun. 16, 1992

[54] AUTOMATIC DRAIN VALVE

[76] Inventor: Charng-Liang Chuang, No. 296, Min Tsu 1st Rd., Kaohsiung, Taiwan

[21] Appl. No.: 778,511

[22] Filed: Oct. 17, 1991

[51] Int. Cl.⁵ ............... F16T 1/20; F16K 31/34; F16K 33/00
[52] U.S. Cl. .................... 137/195; 137/415; 137/430; 137/450
[58] Field of Search ............ 137/195, 196, 413, 415, 137/430, 450

[56] References Cited

U.S. PATENT DOCUMENTS

| | | | |
|---|---|---|---|
| 2,726,732 | 12/1955 | Faust et al. | 137/195 |
| 2,856,949 | 10/1958 | Branson | 137/195 |
| 3,275,020 | 9/1966 | Fujiwara | 137/195 |
| 3,418,789 | 12/1968 | Hoffman et al. | 137/195 |
| 3,635,238 | 1/1972 | Hankison et al. | 137/195 |
| 3,993,090 | 11/1976 | Hankison | 137/195 |
| 4,082,107 | 4/1978 | Hoffman et al. | 137/195 |
| 4,275,755 | 6/1981 | Foller et al. | 137/195 |
| 4,574,829 | 3/1986 | Cummings et al. | 137/195 |
| 4,779,640 | 10/1988 | Cummings et al. | 137/195 |
| 5,004,004 | 4/1991 | Cummings | 137/195 |

Primary Examiner—George L. Walton
Attorney, Agent, or Firm—Peterson, Wicks, Nemer & Kamrath

[57] ABSTRACT

A drain valve including a housing engaged on a base, compressed air may flow into the housing via an inlet of the base, a casing disposed in the upper portion of the housing, a piston slidably engaged in the casing, a rod extended downward from the piston into an outlet of the base for blocking the outlet, a puncture formed in the upper portion of the casing, a plug disposed for blocking the aperture and can be opened by a float. The condensate is accumulated within the lower portion of the housing. Most of the parts are disposed within the upper portion of the housing.

3 Claims, 4 Drawing Sheets

AUTOMATIC DRAIN VALVE

BACKGROUND OF THE INVENTION

1. Field of the Invention

The present invention relates to a valve, and more particularly to an automatic drain valve for a compressor or the like.

2. Description of the Prior Art

Various kinds of automatic liquid discharge mechanism have been developed, one of which is disclosed in U.S. Pat. No. 3,418,789 to Hoffman et al., entitled "Automatic Liquid Discharge Mechanism". In this patent, the actuating float 42 and the serve 40 include a plurality of parts and elements disposed therein, as can be clearly seen from FIG. 2 thereof, so that the liquid discharging mechanism has a very complicated configuration and so that the manufacturing cost thereof is greatly increased. In addition, most of the parts and elements of the mechanism are disposed in the lower portion of the liquid container 14 where condensate and dirt will be collected and accumulated so that the parts are apt to be rusted.

Another type of liquid discharge mechanism is disclosed in U.S. Pat. No. 3,993,090 to Hankison, entitled "Automatic Valving Device". Similarly, most of the parts, particularly the springs, are disposed in the lower liquid receiving portion 18 where condensate and dirt will be collected and accumulated. The parts thereof are apt to be rusted.

The present invention has arisen to mitigate and/or obviate the afore-described disadvantages of the conventional drain valves.

SUMMARY OF THE INVENTION

The primary objective of the present invention is to provide an automatic drain valve in which most of the parts are disposed above the liquid receiving chamber so that the parts can be prevented from rust problems and can be operated effectively.

In accordance with one aspect of the invention, there is provided a drain valve including a base and a housing engaged on the base, a partition plate disposed in the housing so as to separate the housing into a lower chamber and an upper chamber, an orifice formed in the partition plate, the base including an outlet and an inlet in communication with the lower chamber of the housing, a casing disposed on the partition plate and including a sleeve formed integral on an upper portion thereof, a piston slidably engaged in the casing, a biasing means for biasing the piston downward, a rod having an upper end formed integral with the piston and having a valving means disposed on a lower end thereof, the valving means being provided for blocking the outlet of the base so that the condensate can be accumulated within the lower chamber, the outlet being opened when the piston and the rod are pushed downward so that the condensate can be discharged, at least one hole being formed in a lower portion of the casing so that the compressed air may flow into the casing for urging the piston and the rod to move upward in order to enable the outlet to be blocked by the valving means, a puncture formed in the sleeve and communicated between the sleeve and the casing, a plug provided in the sleeve to block the aperture, and a float provided to move the plug away from the aperture when the condensate accumulated within the lower chamber of the housing reaches a predetermined level so as to enable the compressed air to flow into the casing via the aperture, the outlet being opened when the piston and the rod and the valving means are pushed downward by the biasing means so that the condensate accumulated within the lower chamber of the housing can be discharged.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
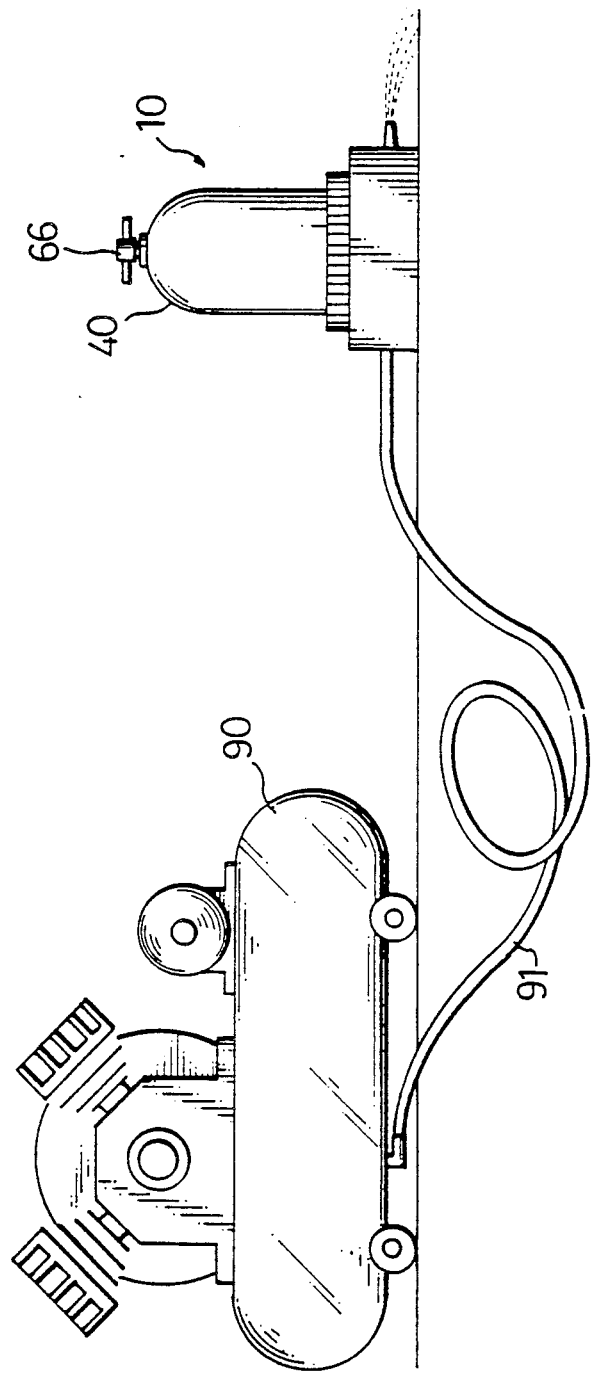
FIG. 1 is a layout of an automatic drain valve which is coupled to an air compressor.

Referring to the drawings and initially to FIG. 1, an automatic drain valve is generally indicated by the reference numeral 10 and is coupled to an air compressor 90 or the like by a pipe 91. The automatic drain valve 10 is provided for periodically discharging condensate and liquid contaminants from the compressor, without loss of pressure or of compressed fluid.

Figure 2:
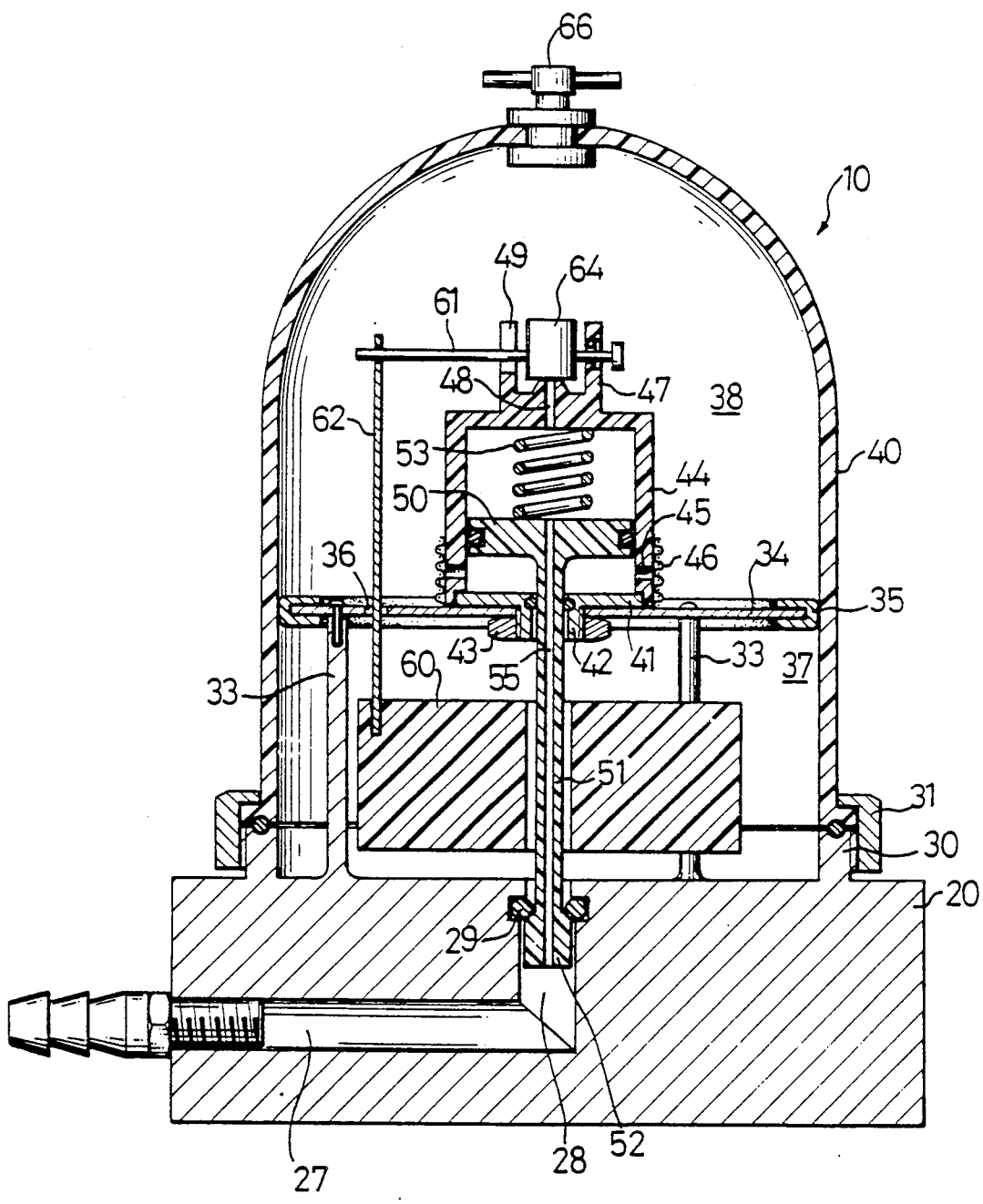
FIG. 2 is a cross sectional view of the automatic drain valve.
Figure 3:
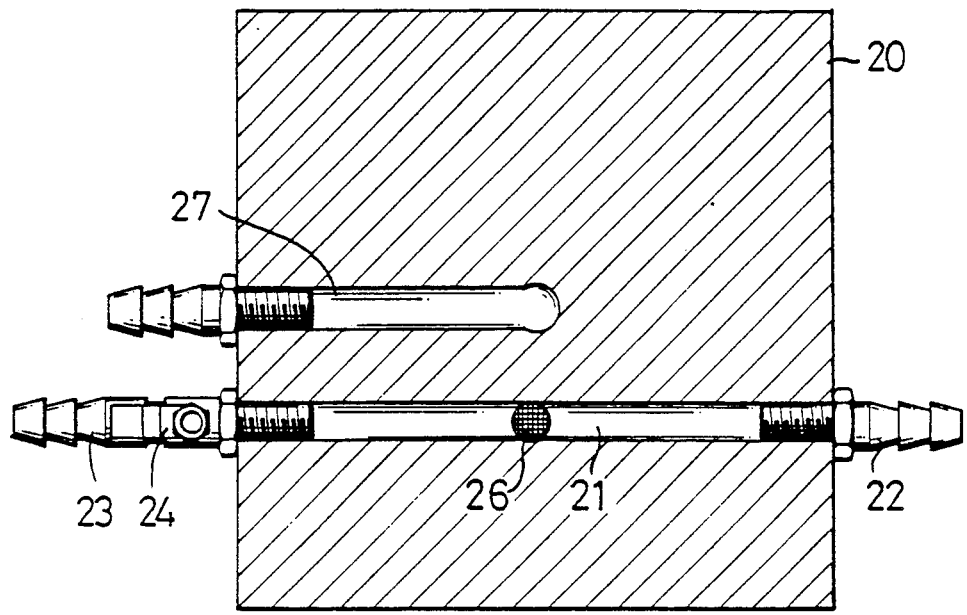
FIG. 3 is a horizontal cross sectional view of the base of the automatic drain valve.
Figure 4:
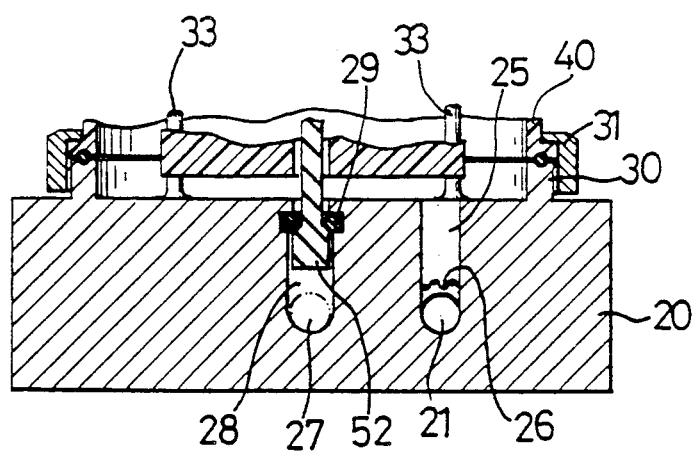
FIG. 4 is a vertical cross sectional view of the base of the automatic drain valve.

Referring next to FIGS. 2, 3 and 4, the drain valve comprises generally a base 20 and a housing 40 disposed on the base 20. The base 20 includes an aperture 21 laterally formed therethrough. The aperture 21 has an inlet port 22 coupled to the compressor 90 (FIG. 1) and an outlet port 23. A valve 24 is disposed in the outlet port 23 for controlling the opening of the outlet port 23. An access 25 is vertically formed in the base 20 and is communicated with the aperture 21 and has a filter screen 26 disposed therein. A passage 27 is formed in the base 20 substantially in parallel to the aperture 21. An opening 28 is vertically formed in the base 20 and is communicated with the passage 27 and has a sealing ring 29 disposed therein.

An annular flange 30 extends upward from the base 20. The housing 40 is coupled to the annular flange 30 by a nut 31 which is threadedly engaged to the annular flange 30 so that the housing 40 can be retained in place. At least three posts 33 extend upward from the base 20 and have a partition plate 34 disposed on the upper portion thereof so that the interior of the housing 40 is separated into a lower chamber 37 and an upper chamber 38 by the partition plate 34. A sealing ring 35 is preferably disposed between the partition plate 34 and the inner peripheral surface of the housing 40. The partition plate 34 has an orifice 36 formed therein.

A disc 41 is disposed on the center of the partition plate 34 and has an annular flange 42 extended downward through the partition plate 34 for threaded engagement with a nut 43 so that the disc 41 can be fixed in place. A casing 44 has a lower end engaged to the disc 41 such as by force-fitted engagement and includes a plurality of holes 45 formed in the lower portion thereof. A filter screen 46 is provided around the lower portion of the casing 44 so as to prohibit dirt from entering into the casing 44 via the holes 45. A sleeve 47 of reduced diameter is formed integral on top of the casing 44 and has a notch 49 formed therein. A puncture 48 is formed and communicated between the sleeve 47 and the casing 44.

A piston 50 is slidably engaged in the casing 44 and has a rod 51 extended downward therefrom. The rod 51 extends through the disc 41 and has a lower end extending into the opening 28 of the base 20 and has an approach 55 formed therethrough. A head 52 of enlarged diameter is formed on the lower end of the rod 51 and extends downward beyond the sealing ring 29. The opening 28 can be blocked when the head 52 moves upward to engage with the sealing ring 29. A spring 53 is disposed between the casing 44 and the piston 50 for biasing the piston 50 downward so that the head 52 of the rod 51 can be caused to move away from the sealing ring 29 and so that the opening 28 can be opened.

A float 60 is disposed in the lower chamber 37 of the housing 40 and is provided around the rod 51. A lever 61 has a first end pivotally coupled to the sleeve 47 and has a middle portion laterally extended through the notch 49 of the sleeve 40 and has a second end extended outward beyond the sleeve 47. The lever 61 is coupled to the float 60 by a link 62 which extends through the orifice 36 of the partition plate 34. A plug 64 is engaged on the lever 61 and is located within the sleeve 47. The puncture 48 can be blocked by the plug 64 when the plug 64 moves downward. The plug 64 can be caused to move upward when the second end of the lever 61 is caused to move upward by the float 60 so that the puncture 48 can be opened. An air pressure control valve 66 is disposed on top of the housing 40.

In operation, initially, as shown in FIG. 2, no water is contained within the lower chamber 37 so that the float 60 moves downward in order that the puncture 48 can be blocked by the plug 64. The compressed air and the liquid contaminants from the compressor 90 may flow into the lower chamber 37 via the aperture 21 and the access 25 of the base 20. Impurities and the like can be filtered out by the filter screen 26 and can be prevented from entering into the lower chamber 37. The compressed air then flows into the upper chamber 38 via the orifice 36 and flows through the holes 45 of the casing 44 so that the pressure within the upper chamber 38 will be built up gradually and so that the piston 50 can be pushed upward against the spring 53 by the pressurized air. At this moment, the head 52 of the rod 51 is caused to move upward to engage with the sealing ring 29 in order to block the opening 28. The compressed air may flow into the upper chamber 38, and the condensate and the liquid contaminants will be accumulated and received within the lower chamber 37 when the opening 28 is blocked.

Figure 5:
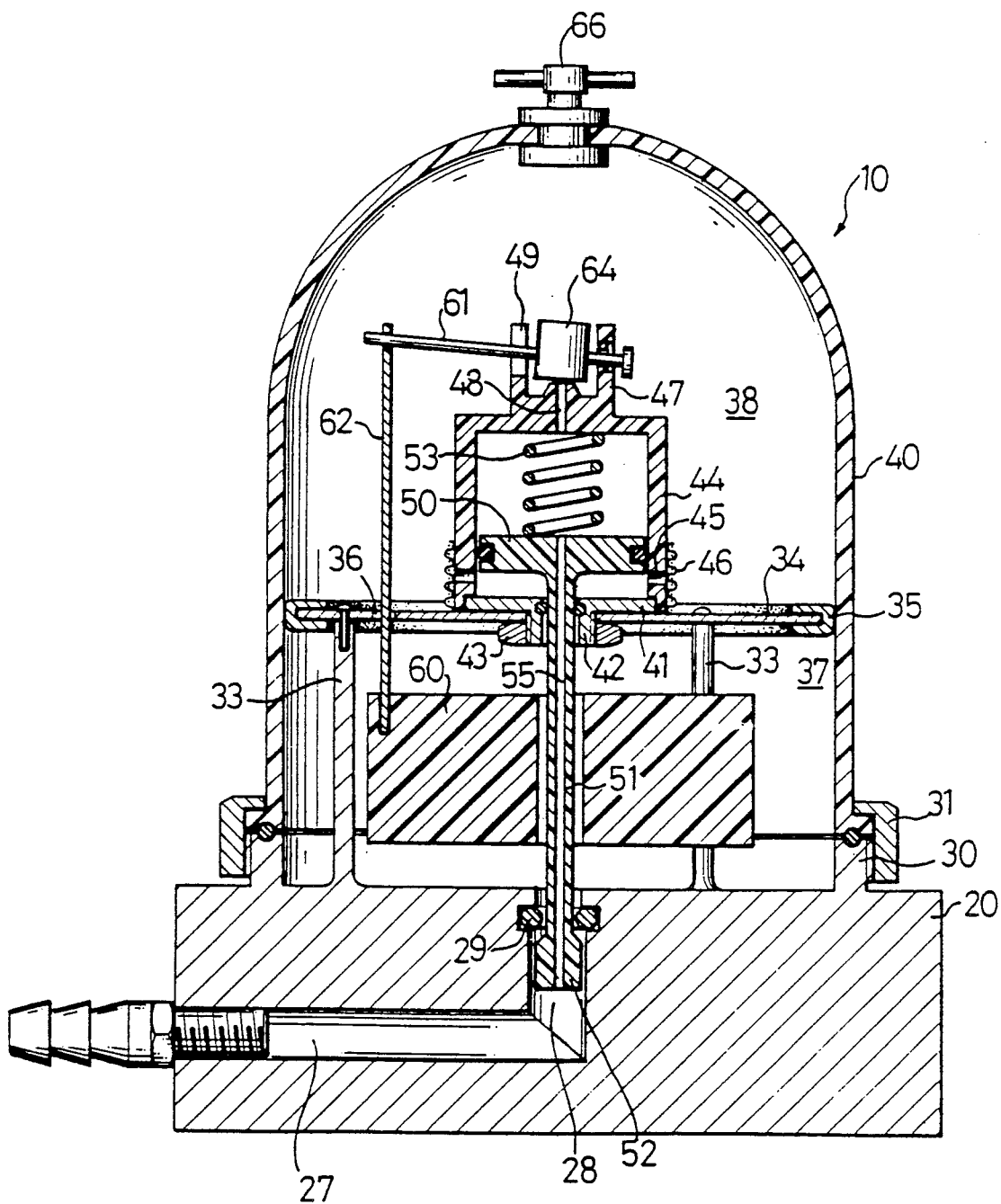
FIG. 5 is a cross sectional view of the automatic drain valve similar to FIG. 2.

When the condensate accumulated within the lower chamber 37 reaches a predetermined level, the float 60 is caused to move upward so that the plug 64 can be caused to move upward away from the puncture 48 and so that the pressurized air may flow into the casing 44 via the puncture 48, as shown in FIG. 5. The piston 50 is pushed downward by the spring 53 when the pressures above and below the piston 50 are balanced so that the head 52 is caused to be disengaged from the sealing ring 29. The opening 28 is thus opened so that the condensate accumulated within the lower chamber 37 may flow out via the opening 28 and the passage 27.

It is to be noted that the air pressure control valve 66 can be opened manually in order to release the air pressure built within the housing 40, so that water condensate and compressed air may flow into the housing 40 via the aperture 21.

It is further to be noted that the contaminant and dirt filtered out by the filter 26 can be blown out of the aperture 21 when the valve 24 is opened.

Accordingly, the automatic drain valve includes few parts and elements. Most of the parts are disposed above the partition plate 34 and will not be immersed within the condensate so that the drain valve can be operated effectively.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A drain valve comprising generally a base and a housing engaged on said base, a partition plate disposed in said housing so as to separate an interior of said housing into a lower chamber and an upper chamber, said partition plate including an orifice formed therein for communicating said lower chamber and said upper chamber, said base including an outlet and an inlet in communication with said lower chamber of said housing so that condensate and compressed air may flow into said housing via said inlet and may flow out of said housing via said outlet, a casing disposed on said partition plate and disposed in said upper chamber of said housing and including a sleeve formed integral on an upper portion thereof, a piston slidably engaged in said casing, a biasing means for biasing said piston downward, a rod having an upper end formed integral with said piston and having a valving means disposed on a lower end thereof, said valving means being provided for blocking said outlet of said base so that said condensate can be accumulated within said lower chamber, said outlet being opened when said piston and said rod are pushed downward by said biasing means so that said condensate can be discharged, at least one hole being formed in a lower portion of said casing so that said compressed air may flow into said casing for urging said piston and said rod to move upward in order to enable said outlet to be blocked by said valving means, a puncture formed in said sleeve and communicated between said sleeve and said casing, a plug provided in said sleeve to block said aperture, and a float disposed in said lower chamber of said housing and including an extension movable through said orifice for actuating said plug, said plug being moved away from said aperture when said condensate accumulated within said lower chamber of said housing reaches a predetermined level so as to enable said compressed air to flow into said casing via said aperture in order to balance said piston, such that said piston and said valving means can be biased downward by said biasing means, said outlet being opened when said piston and said rod and said valving means are pushed downward by said biasing means so that said condensate accumulated within said lower chamber of said housing can be discharged.

2. A drain valve according to claim 1, wherein said sleeve includes a notch formed in an upper portion thereof, a lever has a first end pivotally coupled to said sleeve and has a middle portion extended through said notch and has a second end extended outward beyond said sleeve, said plug is engaged on said lever close to said first end thereof and is located within said sleeve, and a link is coupled between said float and said second end of said lever so that said plug can be caused to move upward by said float, and said link extends through said orifice of said partition plate.

3. A drain valve according to claim 1, wherein at least three posts are extended upward from said base, said partition plate is disposed on said posts so as to separate said interior of said housing into said lower chamber and said upper chamber.

* * * * *